(12) United States Patent
Autor (10) Patent No.: US 7,652,589 B2
(45) Date of Patent: Jan. 26, 2010

(54) SELECTING A FUNCTION OF COMPONENTS BASED ON ORIENTATION

(75) Inventor: Jeffrey S. Autor, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 626 days.

(21) Appl. No.: 11/051,697

(22) Filed: Feb. 4, 2005

(65) Prior Publication Data

US 2006/0174687 A1 Aug. 10, 2006

(51) Int. Cl.
*G08B 5/22* (2006.01)

(52) U.S. Cl. .............. 340/815.45; 312/223.5; 340/815.4; 345/156

(58) Field of Classification Search ......... 345/156, 345/158, 168, 169, 170; 711/4, 112, 113, 711/202; 312/223.1, 223.2, 223.5; 340/815.4, 340/815.45, 815.65; 361/600, 679, 683, 361/684, 685, 686, 826, 828; 715/700, 733, 715/734, 736, 740, 741, 750, 761
See application file for complete search history.

(56) References Cited

U.S. PATENT DOCUMENTS

| 5,689,416 A | * | 11/1997 | Shimizu et al. ............... 700/80 |
| 6,595,666 B1 | | 7/2003 | Exilien |
| 6,754,074 B2 | * | 6/2004 | McClelland et al. ......... 361/690 |
| 6,919,816 B2 | * | 7/2005 | Dearborn et al. ........ 340/815.45 |
| 6,924,780 B1 | * | 8/2005 | Horst et al. .................... 345/82 |
| 2002/0021278 A1 | * | 2/2002 | Hinckley et al. ............. 345/156 |
| 2002/0190868 A1 | * | 12/2002 | Dearborn et al. ......... 340/691.1 |
| 2004/0212597 A1 | | 10/2004 | Nuovo et al. |
| 2005/0091431 A1 | * | 4/2005 | Olodort et al. ................. 710/72 |
| 2005/0134439 A1 | * | 6/2005 | Moore et al. ................. 340/432 |

OTHER PUBLICATIONS

Hewlett-Packard Development Company, L.P., Office Action dated Mar. 13, 2009, Chinese Patent Application No. 200610003753.3, filed Feb. 5, 2006, 3 p.

* cited by examiner

*Primary Examiner*—My-Chau T Tran (57) ABSTRACT

In at least some embodiments, a method comprises determining an orientation of a device, said device having at least one component with a selectable function. The method further comprises selecting a function for the at least one component based on the orientation.

18 Claims, 6 Drawing Sheets

SELECTING A FUNCTION OF COMPONENTS BASED ON ORIENTATION

BACKGROUND

Electronic devices may comprise input components (e.g., push buttons) and output components (e.g., status/activity indicators). These input components and output components enable a user or technician to perform a predetermined function, determine activities being performed by the device, determine status information of the device, or enables some other function. For example, input components may enable a user to perform functions such as powering on a device, powering off a device or performing an identify check of a device whereas output components may indicate power status or health status information to a user.

In some cases, it may be desirable to install some devices (e.g., computer and servers) in an enclosure (e.g., a rack) according to a first orientation and other devices in the rack according to a second orientation, which is opposite the first orientation. For example, some computers may be asymmetrically shaped. By installing pairs of asymmetrical computers in opposite orientations, space can be conserved in a computer rack. However, with neighboring computers in opposite orientations, discerning the function of the input components and/or output components on each computer is made more difficult. For example, a top component on a first computer may appear as a bottom component on a second computer installed upside down and adjacent the first computer. Thus, when viewing a plurality of computers in opposite orientations, use and/or analysis of the components of multiple computers may be confusing or, at least, tedious. Additionally, discerning component labels when a device is in an upside down orientation may be difficult.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The term "system" refers to a collection of two or more parts and may be used to refer to a computer system, a portion of a computer system, or a network of computer systems.

DETAILED DESCRIPTION

As disclosed herein, embodiments of the invention selectively assign function to a component based on a device's orientation. For example, the component may be an input component (i.e., a component configured to input signals or information to the device) or an output component (e.g., a component configured to output signals or information to the device) and the device may be a computer. By selectively assigning a function to a component based on device orientation, confusion with regard to a component's function may be reduced.

Figure 1:
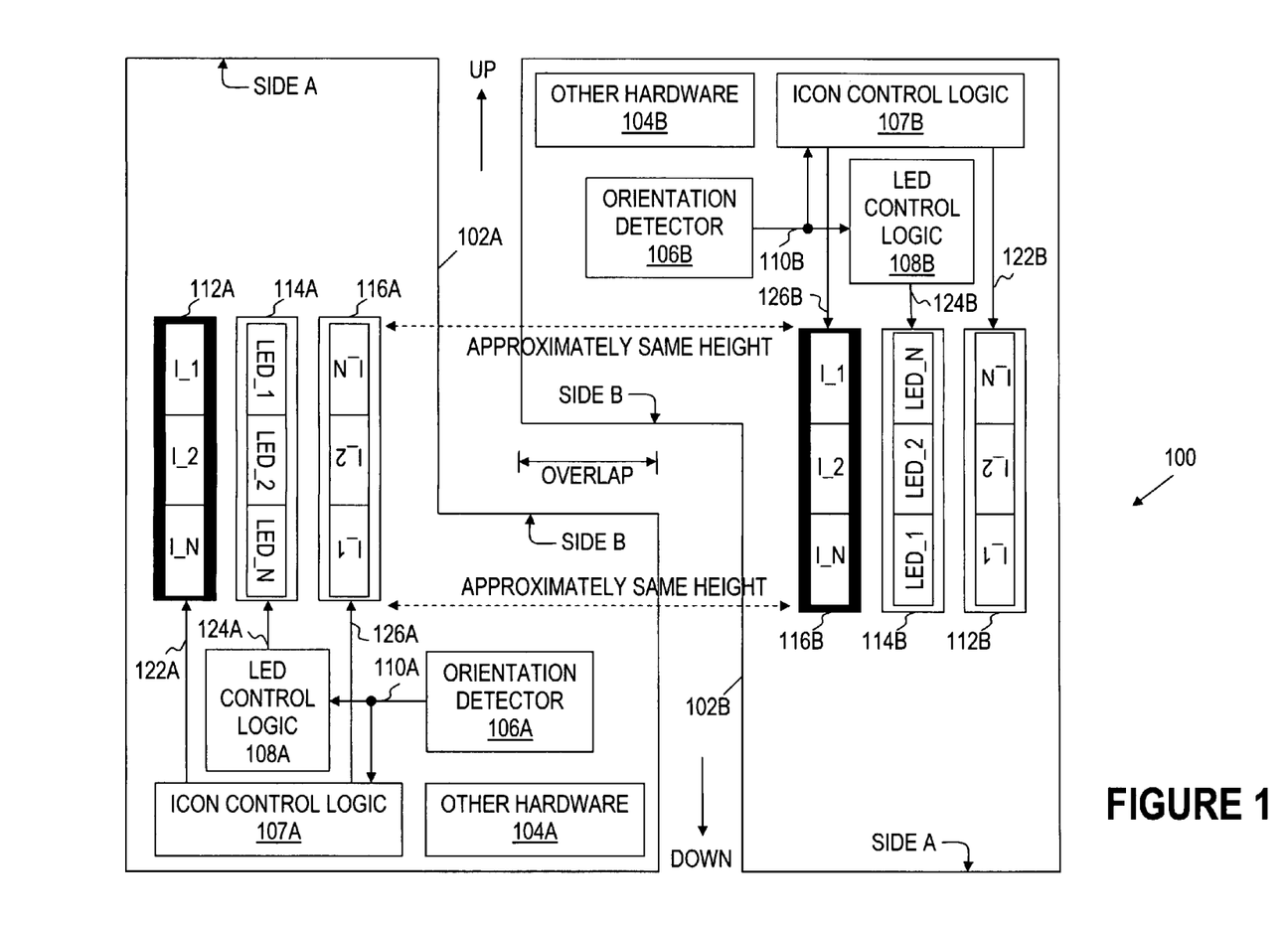
FIG. 1 shows two devices in opposite orientations in accordance with embodiments of the invention.

FIG. 1 illustrates two devices in opposite orientations in accordance with embodiments of the invention. As shown in FIG. 1, a first device 102A and a second device 102B are positioned in opposite vertical orientations. The devices 102A, 102B are asymmetrical (i.e., the chassis of each device 102A, 102B is asymmetrical) such that positioning the devices 102A, 102B in opposite orientations conserves space. For example, if the devices 102A, 102B were placed in an enclosure (e.g., a rack), space is conserved by installing the devices 102A, 102B as shown (with the sides A of the devices 102A, 102B in opposite orientations and with sides B of the devices 102A, 102B overlapping). The devices 102A, 102B may be servers or other electronic devices. In the embodiment of FIG. 1, LEDs are illustrated as the components whose function is selected based on the orientation of the devices 102A, 102B. However, embodiments are not limited to LED components and may implement other components such as input devices, output devices, push buttons or indicators.

The device 102A comprises an orientation detector 106A coupled to light emitting diode ("LED") control logic 108A and icon control logic 107A. The LED control logic 108A couples to an LED unit 114A which comprises a plurality of LEDs (LED_1 to LED_N). As shown, the LEDs may be arranged in a vertical line and may be approximately centered so that the LEDs are approximately located at the same height (i.e., vertical position) whether the devices 102A, 102 B are right side up or upside down. In some embodiments, the LEDs may be arranged in a horizontal line or some other arrangement. The device 102A also comprises other hardware 104A such as processors or processing logic, memory devices and other hardware components.

The icon control logic 107A couples to the icon units 112A and 116A. The icon unit 112A comprises a plurality of icons (I_1 to I_N) or labels in a first orientation. The icons of the icon unit 112A identify the LEDs (e.g., LED_1 to LED_N) when side A of the device 102A is up as shown in FIG. 1. The icon unit 116A comprises a plurality of icons or labels in a second orientation that is opposite the first orientation of the icon unit 112A. The icons of the icon unit 116A identify the LEDs when side A of the device 102A is down. In at least some embodiments, the icon units 112A, 116A use separate illumination (e.g., backlights), so that only one of the icon units 112A, 116A is illuminated at a time.

The icon control logic 107A determines which icon unit 112A, 116A to illuminate based on the signal 110A from the orientation detector 106A. In some embodiments, the orientation detector 106A may be a connector or slot having pins or other electrical conductors. The connector may be configured to transmit the signal 110A based on where the device 102A is positioned (i.e., plugged) in an enclosure (e.g., a rack). For example, if the connector couples to a corresponding connector in a first position of the enclosure, the signal 110A may indicate a first orientation. Likewise, if the connector couples to a corresponding connector in a second position (adjacent the first position) of the enclosure, the signal 110A may indicate a second orientation. Thus, a user may be responsible for placing the device 102A in a predetermined orientation that corresponds to the position of the device 102A within the enclosure. The signal 110A may indicate different orientations based on physical differences of the corresponding connectors (e.g., different pins connect to the orientation detector 106A) or electrical differences (i.e., different corresponding connectors may be configured to transmit different electrical signals).

Alternatively, the signal 110A may be generated by the orientation detector 106A based on motion, gravity, magnetism or some other measurable parameter that indicates an orientation. For example, the orientation detector 106A may be a liquid mercury switch. Alternatively, the orientation detector 106A may be based on a manual switching mechanism that allows a user to determine the orientation and control the signal 110A. For example, the orientation detector 106A may comprise a physical switch on the device 102A that is accessible to a user or may comprise orientation software/logic that is activated and controlled via an input device (e.g., a keyboard or mouse).

In response to the signal 110A, the icon control logic 107A asserts either the signal 122A to illuminate the icon unit 112A or the signal 126A to illuminate the icon unit 116A. As shown in FIG. 1, when side A of the device 102A is up, the icon unit 112A may be illuminated (shown bolded in FIG. 1), while the icon unit 116A is not illuminated. Thus, the right side up icons (I_1 to I_N) of icon unit 112A are viewable by a user, while the upside down icons of icon unit 116A are not viewable by a user.

The LED control logic 108A also receives the signal 110A. In response to the signal 110A, the LED control logic 108A outputs the signal 124A to the LED unit 114A. The signal 124A indicates whether the functions assigned to the LEDs of the LED unit 114A should be reversed or switched (i.e., whether the function of the top LED should be switched to the function of the bottom LED). For example, when side A of the device 102A is up (as shown in FIG. 1), the signal 124A may cause LED_1 to be associated with a function (1), LED_2 to be associated with a function (2), and so on until LED_N which is associated with a function (N). Alternatively, when side A of the device 102A is down, the signal 124A may cause LED_N to be associated with the function (1), LED_2 to be associated with a function (N−1), and so on until LED_1 which is associated with the function (N).

The device 102B functions in a similar fashion as described for the device 102A. In particular, FIG. 1 illustrates that when side A of the device 102B is down, the icons of the icon unit 116B are illuminated, while the icons of the icon unit 112B are not illuminated. Also, when side A of the device 102B is down, the functions assigned to the LEDs of the LED unit 114B are reversed such that LED_N is associated with the function (1), LED_2 is associated with the function (N−1), and so on until LED_1 which is associated with the function (N).

Figure 2:
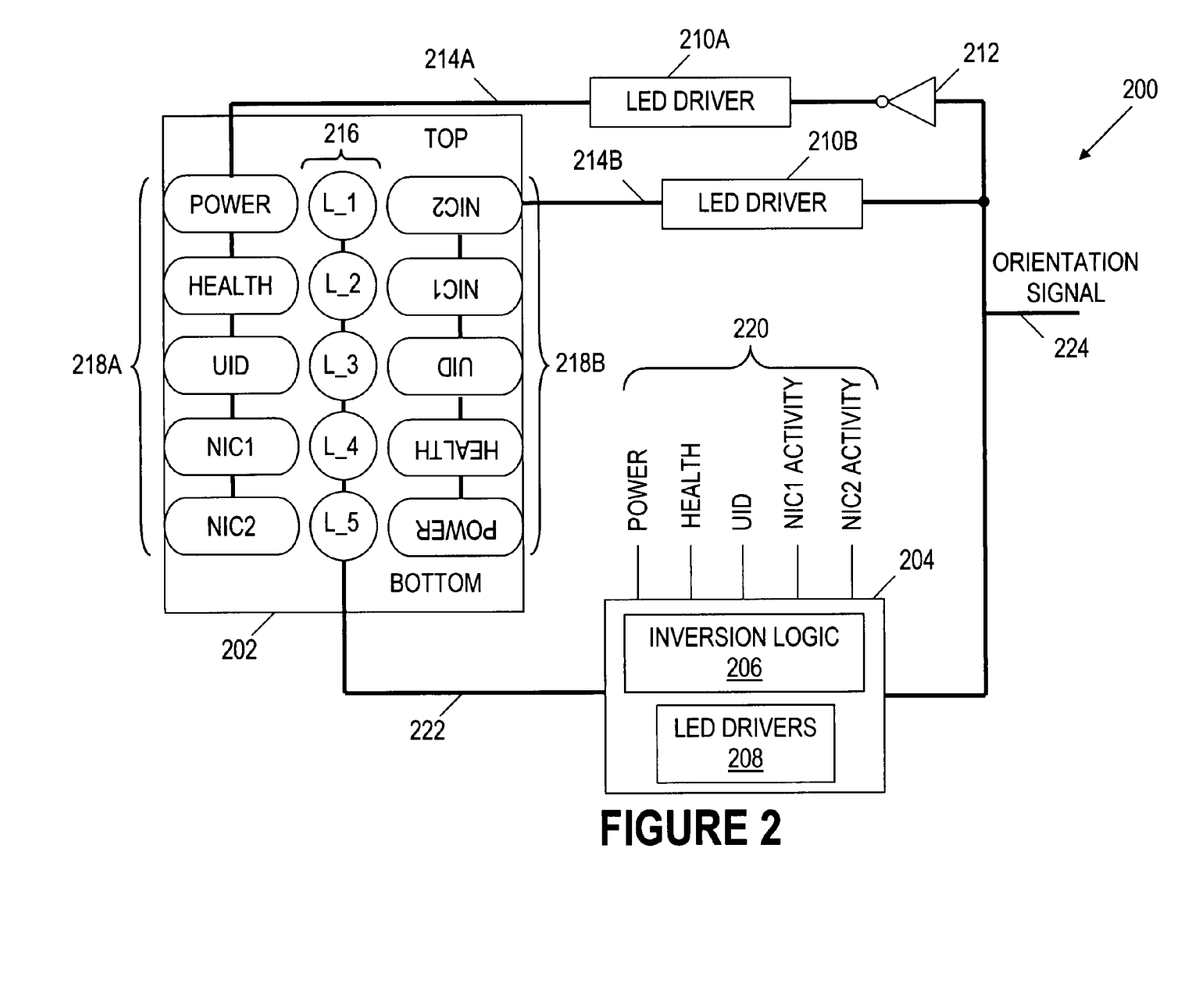
FIG. 2 shows an LED system in accordance with embodiments of the invention.

FIG. 2 illustrates an LED system 200 in accordance with embodiments of the invention. As shown in FIG. 2, the LED system 200 comprises an LED unit 202 having a plurality of LEDs (L_1, L_2, L_3, L_4 and L_5) 216. The LED unit 202 also comprises labels 218A that are right side up when the LED unit 202 is in a first orientation (as shown in FIG. 2) and labels 218B that are right side up when the LED unit 202 is in a second orientation opposite the first orientation. The labels 218A and 218B may couple to and receive power from LED drivers 210A and 210B respectively, based on an orientation signal 224. As shown, the orientation signal 224 is provided to the LED driver 210A via an inverter 212 such that when the LED driver 210B illuminates the labels 218B, the LED driver 210A does not illuminate the labels 218A and vice versa. The labels 218A, 218B identify a function associated with each of the LEDs 216. For example, the functions may be associated with a power status of a device, a health status of a device, an activity status of a device or some other status.

As shown, the system 200 also comprises an LED control unit 204 coupled to the LEDs 216. The LED control unit 204 comprises inversion logic 206 configured to invert or switch a function of the LEDs 216 based on an orientation signal 224. The LED control unit 204 also comprises LED drivers 208 that provide one or more voltage levels to each of the LEDs 216 based on status signals 220. As shown, the status signals 220 comprise a power signal ("POWER"), a health signal ("HEALTH"), a unit identification signal ("UID"), a first network interface card ("NIC") signal ("NIC1 ACTIVITY") and a second NIC signal ("NIC2 ACTIVITY").

The POWER signal indicates one or more power states of a device. For example, the POWER signal may indicate a power off state, a power on state or a sleep state. The HEALTH signal indicates the health of a device. For example, a device may support four health states referred to as normal, attention required, degraded and failed. The UID signal is activated by a user to identify a particular device (from a number of identical devices). The NIC1 ACTIVITY signal indicates when a first NIC card of a device is receiving or transmitting data. The NIC2 ACTIVITY signal indicates when a second NIC card of a device is receiving or transmitting data. While the representative embodiment of FIG. 2 illustrates using the status signals 220 described above, other status signals could be used in addition to or instead of the status signals 220.

In at least some embodiments, one of more of the LEDs 218 are multi-color LEDs capable of displaying different colors (e.g., green, yellow, amber) based on different voltage levels received from the LED drivers 208. An LED's ability to display multiple colors may be used to indicate multiple status levels (e.g., activity levels or health levels) of a function. Due to the switching of LED functions (based on the orientation signal 224) and the use of multi-color LEDs, the relative location of the LEDs 216 with respect to each other becomes non-arbitrary. Thus, the colors associated with individual LEDs 216 may be coordinated to indicate the statuses of two potentially different functions. As described previously, a first function may be assigned to each LED 216 when the LED unit 202 is in a first orientation (e.g., right side up) and a second function may be assigned to each LED 216 when the LED unit 202 is in a second orientation opposite the first orientation. If there is an odd number of LEDs (as shown in FIG. 2), the function of the middle LED (e.g., L_3) may remain constant even though other LEDs are configured to switch function based on the orientation of the LED unit 202.

As shown in FIG. 2, L_1 is associated with the POWER status when the LED unit 202 is right side up and with the NIC2 status when the LED unit 202 is upside down. Thus, L_1 is configured to support the maximum amount of colors (i.e., status levels) used by either the POWER status or the NIC2 status. For example, if both the POWER status and the NIC2 status are configured for use with a single color (as determined by the POWER and the NIC2 ACTIVITY status signals 220), L__1 may comprise a single-color LED. However, if the POWER status is configured for use with one color and the NIC2 status is configured for use with two colors, L__1 may comprise a multi-color LED that supports two colors. Likewise, each of the LEDs 216 should support the maximum amount of colors (i.e., status levels) used by either of the functions associated with each LED 216.

In at least some embodiments, L__1, L__2, L__4 and L__5 comprise multi-color (e.g., green/yellow/amber) LEDs that each support multiple status levels and L__3 comprises a single color (e.g., blue) LED that supports a single status level. However, other embodiments may implement different configurations of LEDs 216 and labels 218A, 218B and are not limited to the representative embodiment of FIG. 2.

As previously mentioned, the function associated with each LED 216 is based, at least in part, on the orientation signal 224. For example, if the orientation signal 224 indicates a first orientation, L__1 is associated with a POWER status and, if the orientation signal 224 indicates a second orientation, L__1 is associated with a NIC2 status. The orientation signal 224 also determines which set of labels 218A or 218B is illuminated. In some embodiments, the orientation signal 224 is based on a measurable parameter such as motion, gravity, magnetism or other measurable parameters. Alternatively, the orientation signal 224 is based on a manual switching mechanism or based on where a device that implements the LED system 200 is located (e.g., odd numbered bays in an enclosure may cause the orientation signal 224 to indicate a first orientation and even numbered bays may cause the orientation signal 224 to indicate a second orientation).

While the representative embodiment of FIG. 2 is associated with selecting or switching functions of LEDs based on orientation, other embodiments may implement similar logic to select or switch functions associated with other components of a device. For example, if a device has one or more input components (e.g., push buttons), selecting a function for each input component based on orientation may prevent confusion when a device changes orientation or when adjacent devices are in opposite orientations.

Figure 3A:
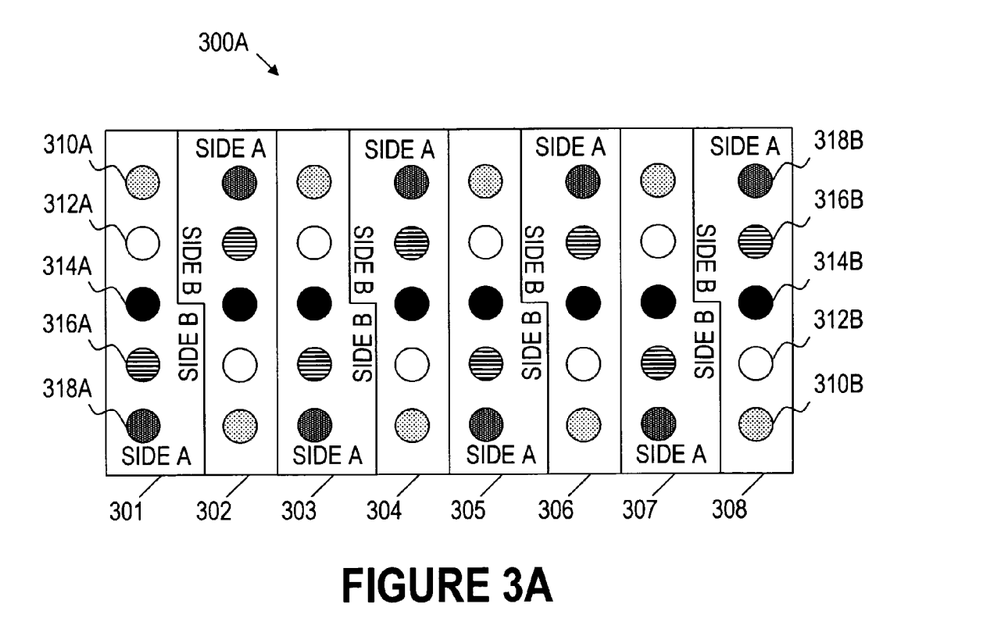
FIG. 3A shows a group of devices in the same state without orientation correction applied to the components.

FIG. 3A shows a group of devices 300A positioned in accordance with embodiments of the invention, but without orientation correction. As shown, the group of devices 300A comprises eight asymmetrical devices 301-308. The odd numbered devices (301, 303, 305 and 307) are each oriented with side A facing down and the even numbered devices (302, 304, 306 and 308) are each oriented with side A facing up. Also, the devices 301-308 are positioned such that side B of neighboring devices overlap. For example, side B of the device 301 overlaps the side B of the device 302. Positioning the devices 301-308 as shown in FIG. 3A conserves space.

Each of the devices 301-308 comprises a plurality of components that are associated with different functions. For example, the components may comprise input components (e.g., push buttons), output components (status indicators) or other components. As shown, the device 301 comprises the components 310A, 312A, 314A, 316A and 318A. Also, the device 308 comprises the components 310B, 312B, 314B, 316B and 318. The other devices 302-307 comprise similar components, however, these components are not labeled for convenience.

In FIG. 3A, the devices 301-308 are shown without orientation correction for the components. For example, the components 310A and 310B have the same function (as indicated by the pattern shared by the components 310A and 310B). Likewise, the components 312A and 312B have the same function, the components 314A and 314B have the same function and so on. As can be seen in FIG. 3A, interpreting and making use of the components of the devices 301-308 may be confusing due to neighboring devices being in opposite vertical orientations (i.e., the top components of the odd numbered devices correspond to the bottom components of the even numbered devices).

Figure 3B:
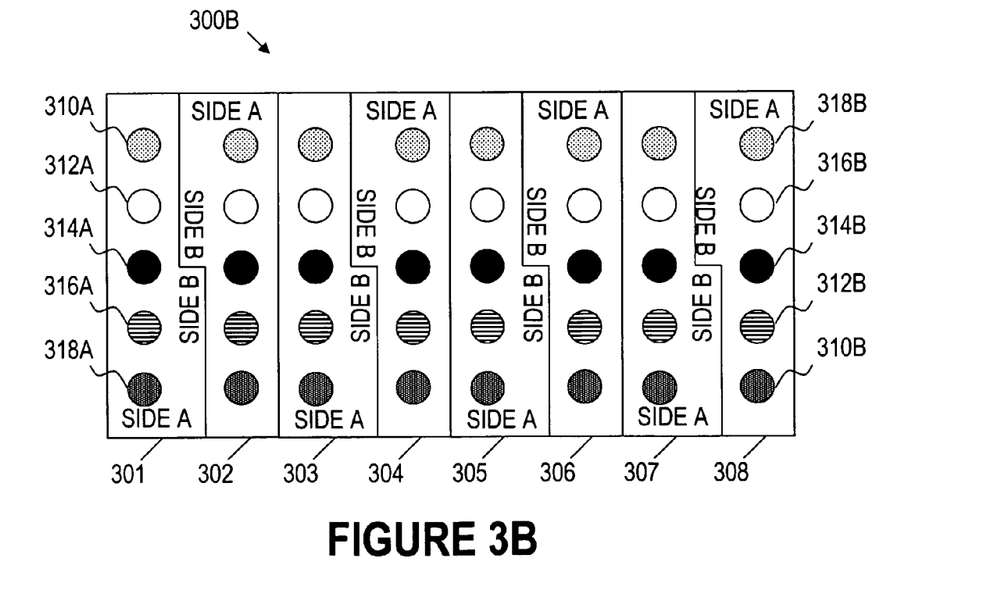
FIG. 3B shows a group of devices in the same state with orientation correction applied to the components.

FIG. 3B shows a group of devices 300B with orientation correction applied to the components in accordance with embodiments of the invention. The devices 301-308 are in the same position as shown previously in FIG. 3A (with neighboring devices in opposite orientations).

Discerning the function of components of the devices 301-308 is facilitated by selecting, switching or inverting the function assigned to the components of the even numbered devices 302, 304, 306 and 308. For example, the component 318B (e.g., the top LED) of the device 308 now has the same function as the component 310A (e.g., the top LED) of the device 301. Likewise, the functions of the components 310B, 312B, 314B and 316B have been inverted from what was described in FIG. 3A. Specifically, the component 310A now corresponds functionally to the component 318B, the component 312A now corresponds functionally to the component 316B, the component 314A still corresponds functionally to the component 314B, the component 316A now corresponds functionally to the component 314B and the component 318A now corresponds functionally to the component 310B. In some embodiments, the even numbered devices 302, 304, 306 and 308 may select or switch functionality of the components using a system (e.g., the LED system 200) such as described previously in FIG. 2.

Figure 4:
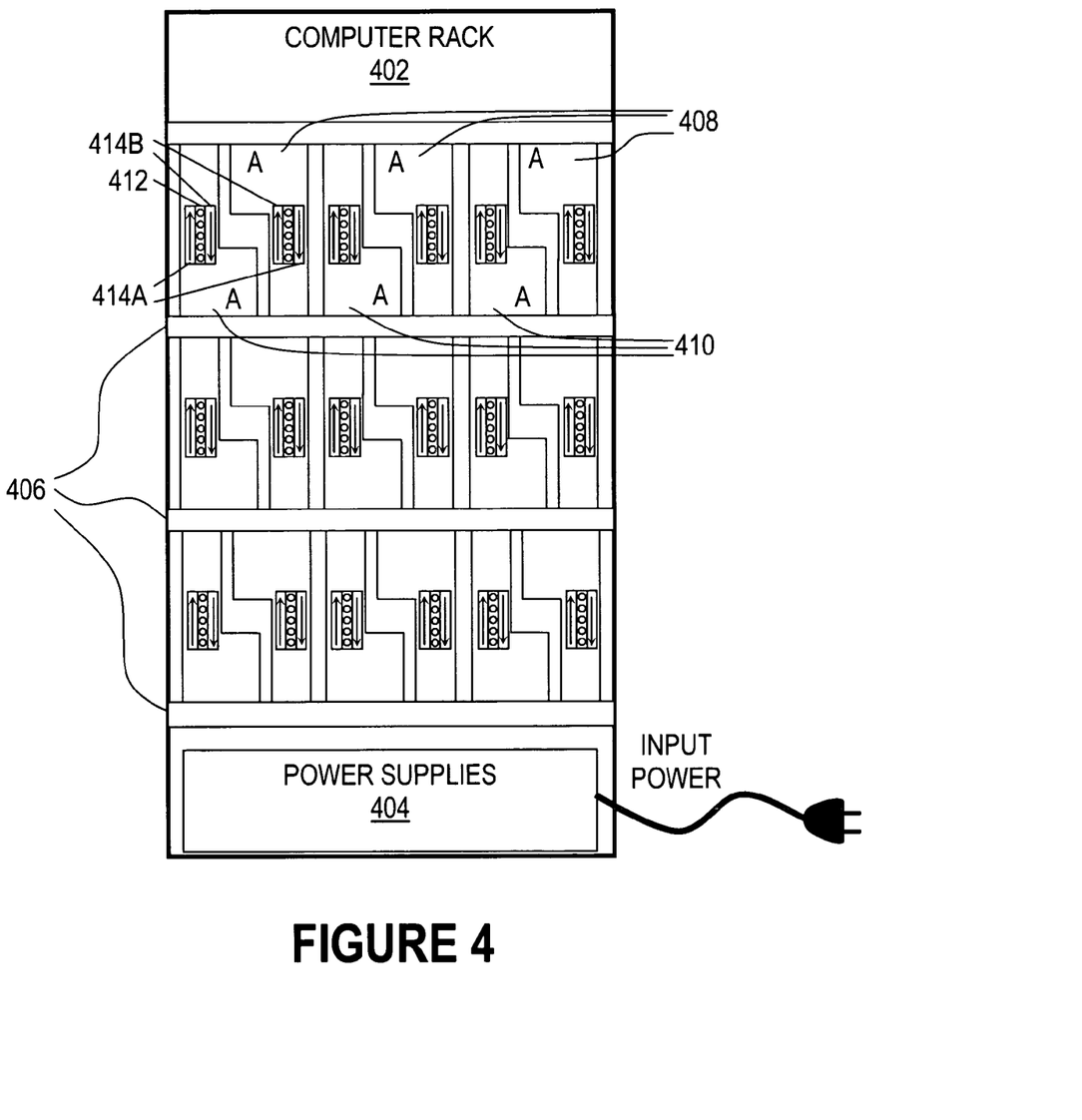
FIG. 4 shows a computer rack in accordance with embodiments of the invention.

Figure 4 illustrates a computer rack 402 in accordance with embodiments of the invention. As shown in FIG. 4, the computer rack 402 comprises a plurality of computers 408, 410 located on shelves 406. Power is provided to the computers 408, 410 through one or more power supplies 404 configured to receive input power via an electrical cable. In at least some embodiments, the computers 408, 410 comprise server computers.

The computers 408 are positioned in a first orientation and the computers 410 are positioned in a second orientation that is opposite the orientation of the computers 408 (e.g., side A of the computers 408 is up while side A of the computers 410 is down). As shown, neighboring computers are positioned such that a portion of neighboring computers overlap. Each computer 408, 410 comprises a component panel 412 having a plurality of components (e.g., LEDs or push buttons). Also, each computer 408, 410 comprises a first set of labels 414A configured to label the components when a computer is positioned with side A facing down and a second set of labels 414B configured to label the components when a computer is positioned with side A facing up. The labels 414A and 414B may be icons or textual labels.

As shown in FIG. 4, arrows are used to represent the orientation of the labels 414A and 414B (the "up" arrows signifies labels that are right side up and the "down" arrow signifies labels that are upside down). Thus, for the computers 410, the labels 414A are right side up and the labels 414B are upside down. Accordingly, the labels 414A of the components 410 may be illuminated (e.g., with a backlight) while the labels 414B of the computers 410 are not illuminated. In contrast, labels 414B for the computers 408 are right side up and the labels 414A are upside down. Accordingly, the labels 414B of the computers 408 may be illuminated while the labels 414A are not illuminated.

The components of the component panel 412 may be single-color LEDs, multi-color LEDs or a combination of single-color and multi-color LEDs. As previously described in FIG. 2, the location of single-color and multi-color LEDs, or alternatively, the assignment of functions to single-color and multi-color LEDs, may be non-arbitrary when one or more LEDs are associated with two different functions. Alternatively, the components of the component panel 412 may comprise other input components or output components. Because the computers 408 and 410 are placed in opposite orientations, selecting or inverting a function of components based on orientation reduces confusion by enabling uniform appearance when the computers 408 and 410 are in the same state and/or by enabling similarly positioned components to have the same function. Otherwise, discerning and/or using the function of the visible components becomes more difficult (as illustrated in FIG. 3A).

Figure 5:
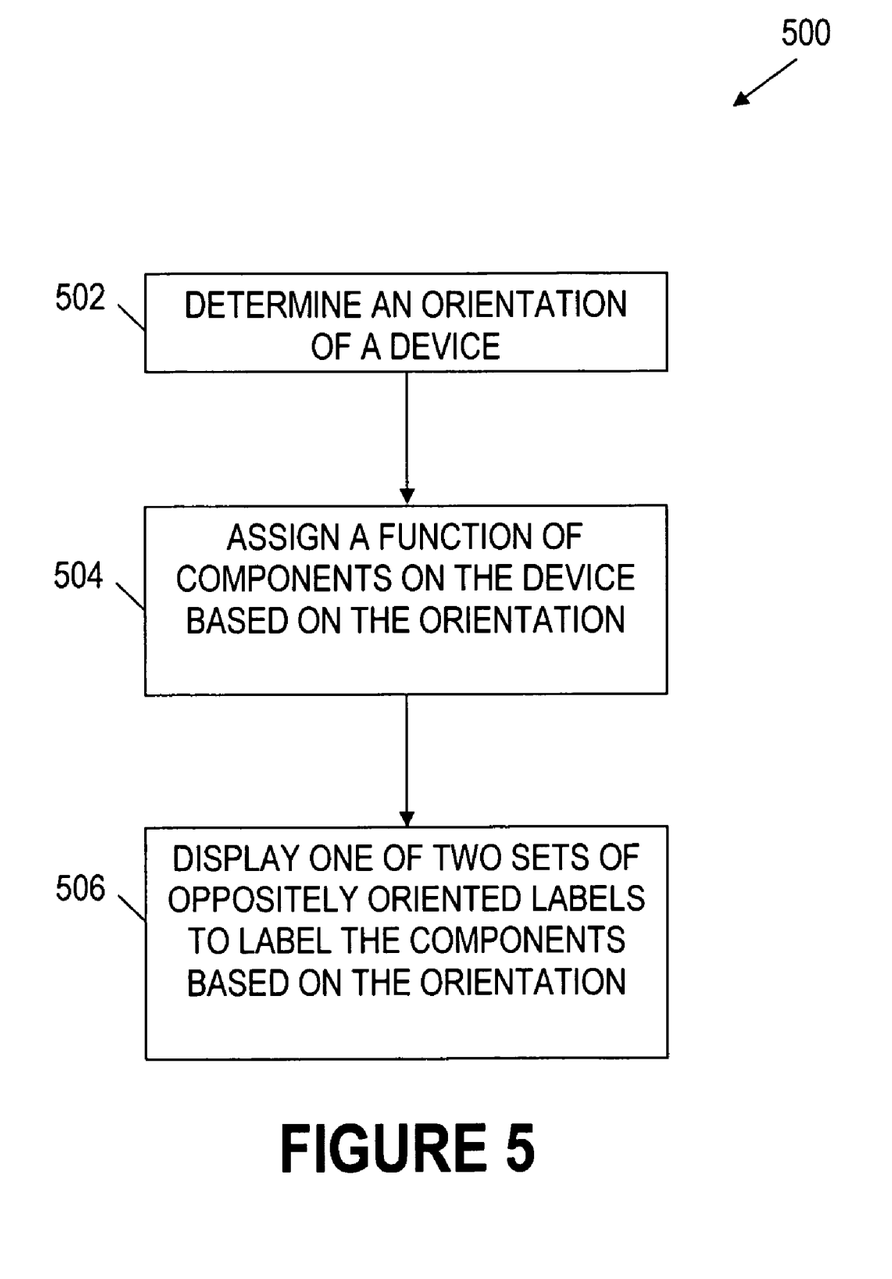
FIG. 5 shows a method in accordance with embodiments of the invention.

FIG. 5 shows a method 500 in accordance with embodiments of the invention. As shown in FIG. 5, the method 500 begins by determining an orientation of a device (block 502). The orientation of the device may be determined by measuring physical parameters (e.g., motion, gravity, magnetism), by toggling a switch, by the location of the device within an enclosure, or by some other mechanism. The method 500 further comprises assigning a function of components on the device based on the orientation (block 504). For example, if the orientation indicates that the device is upside down, a top component (e.g., push button or status indicator) of the device is assigned a first function or, if the orientation indicates that the device is right side up, the top component of the device is assigned a second function. Finally, one of two sets of oppositely oriented labels are displayed to label the components based on the orientation (block 506).

Figure 6:
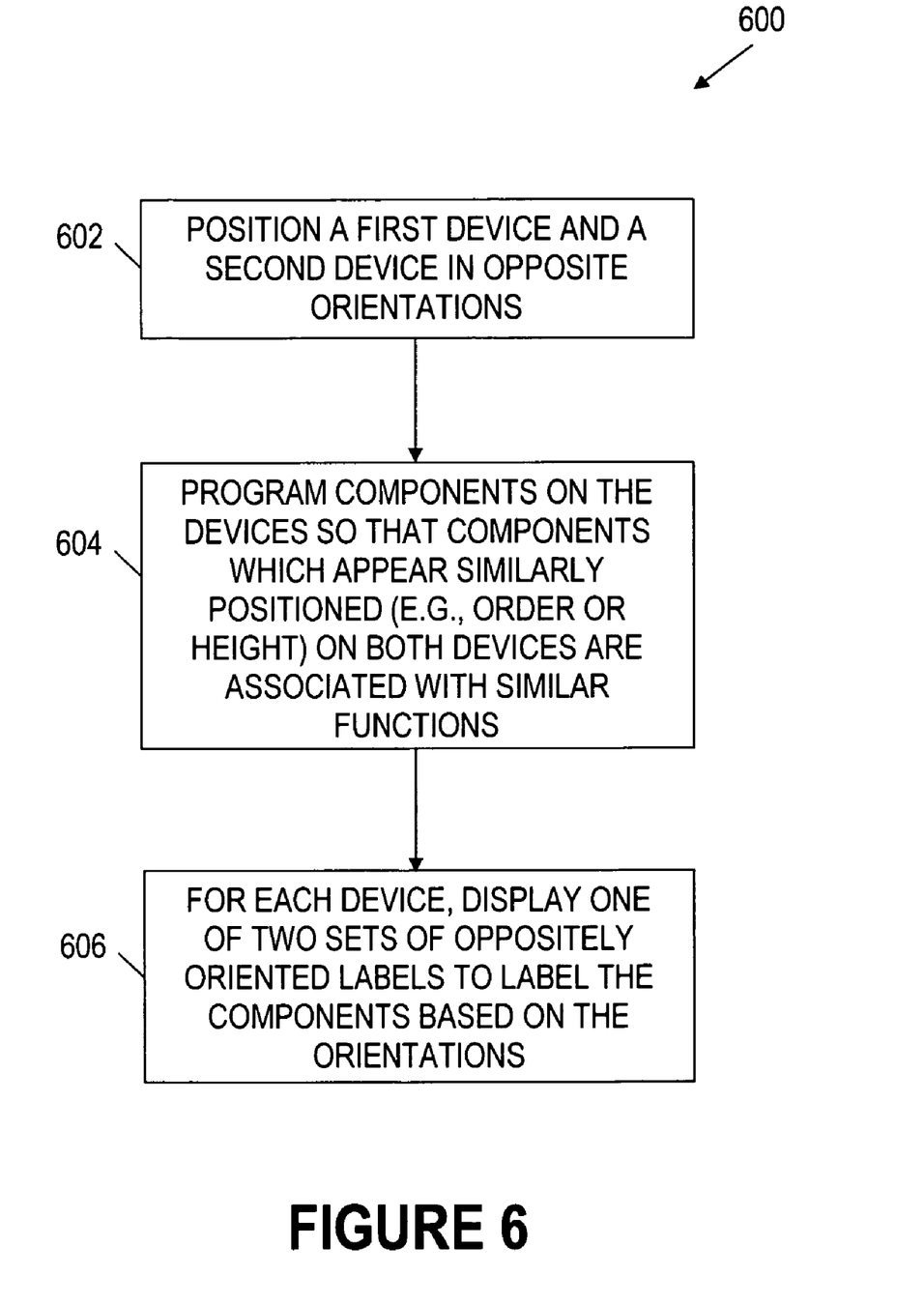
FIG. 6 shows another method in accordance with alternative embodiments of the invention.

FIG. 6 shows another method 600 in accordance with alternative embodiments of the invention. As shown in FIG. 6, the method 600 begins by positioning a first device and a second device in opposite orientations (block 602). The method 600 further comprises programming components of the devices so that components which appear similarly positioned on both devices are associated with similar functions (block 604). For example, the highest components, lowest components, or a plurality of components from highest to lowest on the oppositely oriented devices may be programmed to indicate similar statuses or permit similar functions. Finally, for each device, one of two sets of oppositely oriented labels is displayed to label the components based on the orientations of the devices (block 606).

The above discussion is meant to be illustrative of the principles and various embodiments of the present invention. Numerous variations and modifications will become apparent to those skilled in the art once the above disclosure is fully appreciated. For example, the orientations and labels are not limited to the embodiments disclosed herein. Other orientations (e.g., placing asymmetrical devices on top of each other) are possible. Also, configurations of components and labels need not follow a vertical or horizontal line and may comprise multiple rows and/or columns of components and labels. It is intended that the following claims be interpreted to embrace all such variations and modifications.

What is claimed is:

1. A method, comprising:
   determining an orientation of a device, said device having at least one component with a selectable status indicator function; and
   selecting a status indicator function for the at least one component based on the orientation,
   wherein selecting a status indicator function comprises selecting between at least two of a rower status indicator function, a health status indicator function, and an activity status indicator function.

2. The method of claim 1 further comprising displaying one of two sets of oppositely oriented labels to label a selected status indicator function for each component.

3. The method of claim 1 wherein determining the orientation of the device comprises sensing a measurable parameter that indicates the orientation of the device.

4. The method of claim 1 wherein determining the orientation of the device comprises detecting a manually operated switch position.

5. The method of claim 1 wherein determining the orientation of the device comprises determining a position of the device within an enclosure.

6. A device, comprising:
   a plurality of components, each component being associated with at least one status indicator function of the device;
   component control logic coupled to the components and configured to vary a status indicator function of at least one of the components based on an orientation of the device; and
   two sets of icons in opposite orientations for identifying a status indicator function associated with each of the components.

7. The device of claim 6 further comprising icon control logic configured to illuminate one of the two sets of icons based on the orientation of the device.

8. The device of claim 6 further comprising an orientation detector coupled to the component control logic, the orientation detector asserts a signal that indicates an orientation of the device to the component control logic.

9. The device of claim 8 wherein the orientation detector comprises a manually controlled switch.

10. The device of claim 8 wherein the orientation detector comprises a connector configured to connect to corresponding connectors of an enclosure, wherein adjacent corresponding connectors are configured to cause the signal to indicate opposite orientations of the device to the component control logic.

11. The device of claim 6 wherein the device comprises a computer.

12. The device of claim 6 wherein the components comprise light-emitting diodes (LEDs).

13. The device of claim 6 wherein the components comprise output components.

14. The device of claim 6 further comprising an asymmetrical chassis that encloses at least some hardware of the device.

15. The device of claim 6 wherein at least one of the components is configured to provide a maximum amount of colors used by either of two different status indicator functions assigned to each of the components by the component control logic.

16. The method of claim 1 further comprising switching status indicator functions between different components based on said orientation.

17. The device of claim 6 wherein the component control logic switches the status indicator functions of two components.

18. An apparatus, comprising:
   two status indicators whose assigned function is selected based on a physical orientation of the apparatus once installed in a housing;
   wherein the selected function for at least one of the status indicators varies between two of a power status indicator function, a health status indicator function, and an activity status indicator function.

* * * * *

UNITED STATES PATENT AND TRADEMARK OFFICE
CERTIFICATE OF CORRECTION

PATENT NO. : 7,652,589 B2 Page 1 of 1
APPLICATION NO. : 11/051697
DATED : January 26, 2010
INVENTOR(S) : Jeffrey S. Autor It is certified that error appears in the above-identified patent and that said Letters Patent is hereby corrected as shown below:

In column 7, line 65, in Claim 1, delete "rower" and insert -- power --, therefor.

In column 8, line 61, in Claim 18, delete "housing;" and insert -- housing, --, therefor.

Signed and Sealed this

Thirteenth Day of April, 2010

David J. Kappos
*Director of the United States Patent and Trademark Office*